(12) United States Patent
Berckefeldt et al.

(10) Patent No.: US 12,145,740 B2
(45) Date of Patent: Nov. 19, 2024

(54) MOUNTING DEVICE ADAPTER AND METHOD IN A SYSTEM FOR DISPLAYING MISSION CRITICAL INFORMATION ON AN UNCERTIFIED DISPLAY

(71) Applicant: HONEYWELL INTERNATIONAL INC., Charlotte, NC (US)

(72) Inventors: Richard Berckefeldt, Paola, KS (US); Steven Mead, Bradenton, FL (US); Kalluri Sarma, Phoenix, AZ (US); Willard R. True, Kirkland, WA (US); Yash Thawani, Mumbai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 745 days.

(21) Appl. No.: 17/145,727

(22) Filed: Jan. 11, 2021

(65) Prior Publication Data
US 2022/0144446 A1 May 12, 2022

(30) Foreign Application Priority Data
Nov. 11, 2020 (IN) .............................. 202011049251

(51) Int. Cl.
*B64D 43/00* (2006.01)
*G06T 7/00* (2017.01)
*H04L 67/12* (2022.01)

(52) U.S. Cl.
CPC ............ *B64D 43/00* (2013.01); *G06T 7/0002* (2013.01); *H04L 67/12* (2013.01); *B64D 2203/00* (2013.01); *G06T 2207/30232* (2013.01)

(58) Field of Classification Search
CPC ................ B64D 43/00; B64D 2203/00; B64D 2045/0075; G06T 7/0002; G06T 2207/30232; H04L 67/12
See application file for complete search history.

(56) References Cited

U.S. PATENT DOCUMENTS 3,743,980 A * 7/1973 Steiner ..................... H01H 5/02
335/207
8,364,328 B2 1/2013 Hedrick
(Continued)

FOREIGN PATENT DOCUMENTS

| CA | 3026859 A1 * | 6/2019 | ............. B64D 43/00 |
| EP | 3210891 B1 | 5/2020 | |
| WO | 2019122214 A1 | 6/2019 | |

OTHER PUBLICATIONS

"Guidelines for the Certification, Airworthiness, and Operational Approval of Electronic Flight Bag Computing Devices," U.S. Department of Transportation Advisory Circular, Mar. 17, 2003.

*Primary Examiner* — Ricardo Osorio
(74) *Attorney, Agent, or Firm* — Lorenz & Kopf LLP

(57) ABSTRACT

A mounting system configured to mount a personal electronic device (PED) in an aircraft flight deck is provided. The mounting adapter includes: an annunciator light including an LED strip for providing an annunciation regarding the PED; a display disable system mounted within the mounting adapter for disabling the PED display; and a controller configured to: obtain a captured frame of the PED display; send the captured frame to a server for determining whether a problem exists with an image displayed on the PED display; and responsive to receiving an annunciation indicator from the server indicating that the problem exists with the image displayed on the PED display, enable the display disable system to shut off the PED display and command the annunciator light to illuminate in a particular color that indicates that the PED display was shut off because the problem exists with the image displayed on the PED display.

20 Claims, 6 Drawing Sheets

(56) References Cited

U.S. PATENT DOCUMENTS

| | | |
|---|---|---|
| 9,583,008 B2 | 2/2017 | Marion et al. |
| 9,635,497 B2 | 4/2017 | Anderson et al. |
| 9,714,081 B1 | 7/2017 | Hall, III et al. |
| 10,273,020 B1* | 4/2019 | Berckefeldt ............ G06F 3/147 |
| 10,338,337 B1 | 7/2019 | Berckefeldt et al. |
| 10,636,390 B2 | 4/2020 | Sarma et al. |
| 2005/0276514 A1* | 12/2005 | Fisher .................... G06T 7/001 |
| | | 382/286 |
| 2011/0316655 A1* | 12/2011 | Mehraban ................ H01H 5/02 |
| | | 335/207 |
| 2016/0215926 A1 | 7/2016 | Pollex |
| 2016/0315810 A1* | 10/2016 | Francescangeli ..... H04W 76/14 |
| 2018/0341884 A1* | 11/2018 | Poojary .................... B64F 1/20 |
| 2019/0179097 A1* | 6/2019 | Berckefeldt ....... G02B 27/0093 |
| 2019/0180530 A1 | 6/2019 | True et al. |
| 2019/0180718 A1* | 6/2019 | Sarma ................... B64D 43/02 |

\* cited by examiner

006
MOUNTING DEVICE ADAPTER AND METHOD IN A SYSTEM FOR DISPLAYING MISSION CRITICAL INFORMATION ON AN UNCERTIFIED DISPLAY

CROSS REFERENCE TO RELATED APPLICATION

This application claims priority to Indian Provisional Patent Application No. 202011049251, filed Nov. 11, 2020, the entire content of which is incorporated by reference herein.

TECHNICAL FIELD

The present disclosure generally relates to display systems, and more particularly relates to display systems for displaying critical information on uncertified displays.

BACKGROUND

In many safely critical and/or regulated industries, such as avionics, maritime, rail, medical devices, nuclear, and others, display systems that display mission critical information may need to be certified that they can provide adequate integrity, continuity, and availability (ICA) for the mission critical information to be displayed thereon. The certification process may be costly and time-consuming and, therefore, may deter the implementation of new applications, such as new applications that use personal electronic devices (PEDs) to display mission critical information.

In the avionics industry, low-cost PEDs, such as tablet computers and smartphones, are being used for non-critical applications, such as charts and maps applications and weight and balance calculators. Operators may also want to have the freedom to display aeronautical information, such as airport moving maps, air traffic (Cockpit Display of Traffic Information or CDTI), advanced weather radar information, and others, on tablet computers instead of having to make costly modifications and upgrades to their existing avionics displays. Long-standing regulatory policy prohibits the use of uncertified displays as the primary display of critical aeronautical information during flight because adequate integrity, continuity, and availability (ICA) cannot be assured.

Accordingly, it is desirable to provide a certifiable system for displaying critical information on uncertified displays or displays not approved for the display of data requiring high ICA. Furthermore, other desirable features and characteristics will become apparent from the subsequent detailed description, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a mounting system configured to mount a personal electronic device (PED) having a PED display in an aircraft flight deck and provide a visible indication when a fault condition exists concerning the display of critical aeronautical information on the PED display is disclosed. The mounting adapter includes, an annunciator light including an electrically actuated color indicator (e.g., LED strip) for providing an annunciation regarding the PED; a display disable system (e.g., kill switch) mounted within the mounting adapter for disabling the PED display; and a controller configured to: obtain a captured frame of the PED display (e.g., from a screen capture feature of the PED or a camera trained on the PED display); send the captured frame to a data integrity entity (e.g., a server remote from the display system or a controller on the mounting adapter that implements a data integrity module) for determining whether a problem exists with an image displayed on the PED display; and responsive to receiving an annunciation indicator from the data integrity entity indicating that the problem exists with the image displayed on the PED display, enable the display disable system to shut off the PED display and command the annunciator light to illuminate in a particular color (e.g., red) that indicates that the PED display was shut off because the problem exists with the image displayed on the PED display.

In another embodiment, a display system configured for displaying critical aeronautical information on an aircraft display that is not certified for displaying the critical aeronautical information is disclosed. The display system includes, a personal electronic device (PED) having a PED display wherein the PED is not certified to display the critical aeronautical information, a mounting adapter configured to mount the PED in an aircraft cockpit, the mounting adapter including an annunciator light including an electrically actuated color indicator (e.g., LED strip) for providing an annunciation regarding the PED; a display disable system (e.g., kill switch) mounted within the mounting adapter for disabling the PED display; and a controller configured to: obtain a captured frame of the PED display (e.g., from a screen capture feature of the PED or a camera trained on the PED display), send the captured frame to a data integrity entity (e.g., a server remote from the display system or a controller on the mounting adapter that implements a data integrity module) for determining whether a problem exists with an image displayed on the PED display, and responsive to receiving an annunciation indicator from the data integrity entity indicating that the problem exists with the image displayed on the PED display, enable the display disable system to shut off the PED display and command the annunciator light to illuminate in a particular color (e.g., red) that indicates that the PED display was shut off because the problem exists with the image displayed on the PED display.

In another embodiment, a method in a display system configured for displaying critical aeronautical information on a personal electronic device (PED) having a PED display that is not certified for displaying the critical aeronautical information is disclosed. The method includes providing in a mounting adapter configured to mount the PED in an aircraft cockpit: an annunciator light including an electrically actuated color indicator (e.g., LED strip) for providing an annunciation regarding the PED and a display disable system (e.g., kill switch) mounted within the mounting adapter for disabling the PED display; obtaining a captured frame of the PED display (e.g., from a screen capture feature of the PED or a camera trained on the PED display); sending the captured frame to a data integrity entity (e.g., a server remote from the display system or a controller on the mounting adapter that implements a data integrity module) for determining whether a problem exists with an image displayed on the PED display; and responsive to receiving an annunciation indicator from the data integrity entity indicating that the problem exists with the image displayed on the PED display, enabling the display disable system to shut off the PED display and commanding the annunciator light to illuminate in a particular color (e.g., red) that indicates that the PED display was shut off because the problem exists with the image displayed on the PED display.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1A:
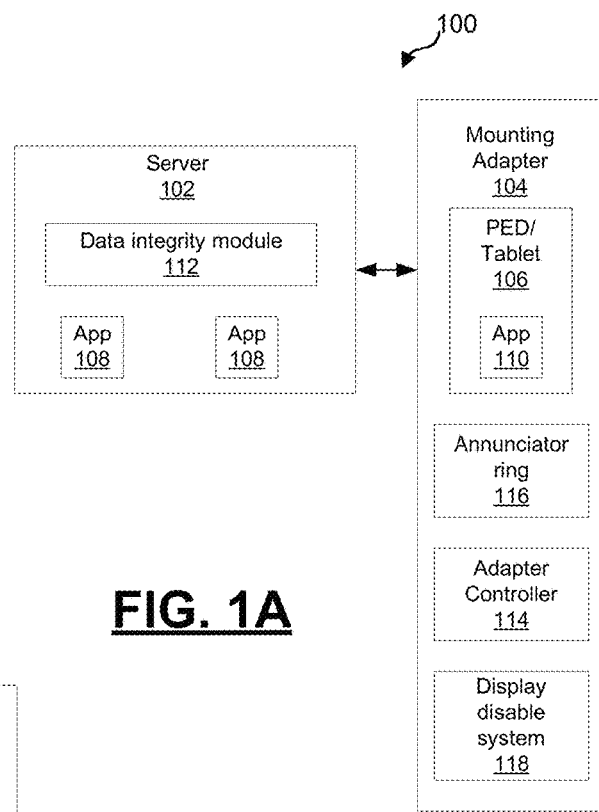
FIG. 1A is a block diagram depicting an example display system in an aircraft that allows uncertified display systems such as commercial PEDs/tablet computers to meet typical avionics requirements for the monitoring of ICA, in accordance with various embodiments.

The following detailed description is merely exemplars in nature and is not intended to limit the application and uses. References to aeronautical and/or aviation specific terms such as but not limited to "cockpit", "flight deck", "certification", or "aircraft" are for simplifying the description and are not intended to limit the application and uses to the aviation or aeronautical industry. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation, application specific integrated circuit (ASIC), a field-programmable gate-array (PPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplars embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements It should be noted that many alternative or additional functional relationships or physical connections may be present in an embodiment of the present disclosure.

Apparatus, systems, methods, techniques, and articles are described for providing assurance that an uncertified display, such as a display on a personal electronic device (PED) (e.g., a tablet computer, a smartphone, or some other device), that is used to display mission critical data (e.g., critical aeronautical information) accurately conveys the mission critical data. The apparatus, systems, methods, techniques and articles described herein may provide assurances that an uncertified display accurately conveys mission critical data by verifying the integrity, continuity, and availability (ICA) of the mission critical data displayed on the uncertified display. Loss of accuracy or ICA can be annunciated lo operators (e.g., a flight crew) of the uncertified display without reliance on the uncertified display to self-report the loss when displaying the mission critical data.

In the case of aeronautical applications, the apparatus, systems, methods, techniques and articles described herein may allow operators to use a PED to display aeronautical information. This may allow for a more affordable and quicker adoption of new avionics functionality. The described apparatus, systems, methods, techniques and articles may allow for mission critical data such as that generated by multiple high integrity applications (e.g. airborne situational awareness (AIRB) and various other CNS-ATM (Communications Navigation and Surveillance-Air Traffic Management) applications such as flight deck interval management (FIM) or air traffic control controller/pilot data link communication (CPDLC), SURF (Surface Surveillance application that includes an airport moving map with traffic superimposed), and others) to be displayed on uncertified displays. At the same time, the described apparatus, systems, methods, techniques and articles can allow data from lower integrity applications, such as maps and charts, to be displayed on the uncertified displays without changes to the applications or equipment installation.

In the description that follows, example mounting device embodiments are provided. The described mounting device embodiments may provide a mechanical capture and mounting mechanism for mounting a PED, such as a tablet computer, on an aircraft flight deck and host ICA monitoring and annunciation functionality. The described mounting device embodiments may be easy to install on the flight deck as a part of an STC (Supplemental Type Certificate—an FAA regulatory approval to modify an aircraft to incorporate specific equipment, software, or functionality). The described mounting device embodiments may make it easy for the flight crew to install commercial tablet computers or smartphones with a wired connector (e.g., a lightning cable or USB connector) or, alternatively, a wireless connection (e.g., Wi-Fi, Bluetooth, near-field communication (NFC), or other wireless communication methods). The described mounting device embodiments should not interfere with normal operations of the PED The described mourning device embodiments should support normal touchscreen functionality and optical display functionality of the PED.

A technical benefit of this approach is the ability to add high integrity applications to an aircraft that is already using low integrity devices (off-the-shelf tablets or other personal electronic devices) or would like to add these applications without the added cost of installing a class 3 EFB or impacting the existing high integrity display and control systems.

FIG. 1A is a block diagram depicting an example system 100 that allows an uncertified display system, such as a PED, to meet typical avionics requirements for the monitoring of ICA. The example system 100 includes an application server 102 and a mounting adapter 104 configured to mount a PED 100 (having a PED display) in an aircraft flight deck or cockpit.

The example application server 102 includes at least one processor and a computer-readable storage device or media encoded with programming instructions for configuring the at least one processor. The example application server 102 is positioned in an aircraft. The example application server 102 is a fully certified avionics box that hosts and executes one or more high integrity avionics application modules 108. The high integrity avionics application modules 108 are configured to generate mission critical data (e.g., critical aeronautical information) for display on a cockpit display. The example application server 102 is configured to transmit the generated critical aeronautical information to an uncertified cockpit display (e.g., the PED 106) for display (e.g., on the PED display).

The example application server 102 also includes a data integrity module 112 that is configured to monitor the image displayed on an uncertified cockpit display when critical aeronautical information is transmitted from a high integrity avionics application module 108 to the uncertified cockpit display device (e.g., PED 106) to determine whether a problem exists with the display of the mission critical data on the uncertified display device. The example data integrity module 112 is configured to determine whether a problem exists with the display of the mission critical data on the uncertified display device 106 by verifying the integrity, continuity, and availability (ICA) of the mission critical data displayed on the uncertified display device 106. The example data integrity module 112 is also configured to cause an annunciation indicating that a problem exists with the display of mission critical data on the uncertified display device 106, when it determines that a problem indeed exists.

The mounting adapter 104 is configured to mount an uncertified display device 106 in an aircraft cockpit for use by a flight crew so that the uncertified display device 106 may display critical or non-critical aeronautical information to the flight crew. When the uncertified display device 106 comprises a tablet computer, the mounting adapter 104 may include a clamshell shape to fully enclose the tablet computer 106.

The example uncertified display device 106 may comprise a PED (such as a tablet computer, a smartphone, or some other device), which includes at least one processor and computer readable media, and is configured to host and execute one or more application programs such as a specialized avionics display application 110. The example specialized avionics display application 110 is configured to display critical aeronautical information received by the PED 106 from the application server 102 and return finger, key, or mouse inputs for a high integrity avionics application module 108 to process.

The example mounting adapter 104 further includes an adapter controller 114. The example controller 114 includes at least one processor find computer readable media. In other embodiments, the adapter controller 114 may not include a processor. The example controller 114 is configured (for example by programming instructions) to transmit images of the display on the uncertified display device 106 to the data integrity module 112 and to activate an annunciation indicating that a problem exists with the display of mission critical data on the uncertified display device 106, when the data integrity module 112 determines that a problem exists.

The example mounting adapter 104 further includes an annunciator fight 116 for providing an annunciation regarding the PED 106. The annunciator light 116 may comprise an annunciator ring such as an LED strip that is fitted around the PED 106 when the PED 106 is mounted in the mounting adapter 104. The annunciator light mas alternatively comprise one or more lights, LEDs, or other electrically actuated color indicators mounted to or fitted within the mounting adaptor 104. The example mounting adapter 104 further includes a display disable system 118 mounted within the mounting adapter 104 for disabling the PED display.

Figure 1B:
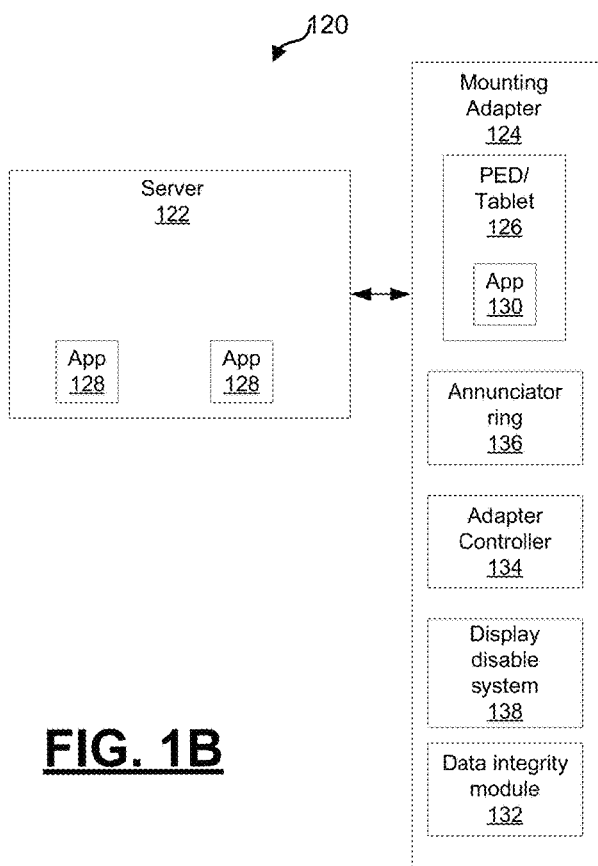
FIG. 1B is a block diagram depicting another example display system in an aircraft that allows uncertified display systems such as commercial PEDs/tablet computers to meet typical avionics requirements for the monitoring of ICA, in accordance with various embodiments.

FIG. 1B is a block diagram depicting another example system 120 that allows an uncertified display system, such as a PED, to meet typical avionics requirements for the monitoring of ICA. The example system 120 includes an application server 122 and a mounting adapter 124 configured to mount a PED 126 (having a PED display) in an aircraft flight deck or cockpit.

The example application server 122 includes at least one processor and a computer-readable storage device or media encoded with programming instructions for configuring the at least one processor. The example application server 122 is positioned in an aircraft. The example application server 122 is a fully certified avionics box that hosts and executes one or more high integrity avionics application modules 128 The high integrity avionics application modules 128 are configured to generate mission critical data (e.g., critical aeronautical information) for display on a cockpit display. The example application server 122 is configured to transmit the generated critical aeronautical information to an uncertified cockpit display (e.g., the PED 126) for display (e.g., on the PED display).

The mounting adapter 124 is configured to mount an uncertified display device 126 in an aircraft cockpit for use by a flight crew so that the uncertified display device 126 may display critical or non-critical aeronautical information to the flight crew. When the uncertified display device 126 comprises a tablet computer, the mounting adapter 124 may include a clamshell shape to fully enclose the tablet computer 126.

The example uncertified display device 126 may comprise a PED (such as a tablet computer, a smartphone, or some other device), which includes at least one processor and computer readable media, and is configured to host and execute one or more application programs such as a specialized avionics display application 130. The example specialized avionics display application 130 is configured to display critical aeronautical information received by the PED 126 from the application server 122 and return finger, key, or mouse inputs for a high integrity avionics application module 128 to process.

The example mounting adapter 124 further includes an adapter controller 134. The example controller 134 includes at least one processor and computer readable media. In other embodiments, the adapter controller 134 may not include a processor. The example controller 134 is configured (for example by programming instructions) to transmit images of the display on the uncertified display device 126 to the data integrity module 112 and to activate an annunciation indicating that a problem exists with the display of mission critical data on the uncertified display device 126, when the data integrity module 132 determines that a problem exists.

The example mounting adapter 124 also includes a data integrity module 132 that is configured to monitor the image displayed on an uncertified cockpit display when critical aeronautical information is transmitted from a high integrity avionics application module 128 to the uncertified cockpit display device (e.g., PED 126) to determine whether a problem exists with the display of the mission critical data on the uncertified display device. The example data integrity module 132 is configured to determine whether a problem exists with the display of the mission critical data on the uncertified display device 126 by verifying the integrity, continuity, and availability (ICA) of the mission critical data displayed on the uncertified display device 126. The example data integrity module 132 is also configured to cause an annunciation indicating that a problem exists with the display of mission critical data on the uncertified display device 126, when it determines that a problem indeed exists. The data integrity module 132 may be implemented by the adapter controller 134 or by a separate controller.

The example mounting adapter 124 further includes an annunciator light 136 for providing an annunciation regarding the PED 126. The annunciator light 136 may comprise an annunciator ring such as an LED strip that is fitted around the PED 126 when the PED 126 is mounted in the mounting adapter 124. The annunciator light may alternatively comprise one or more lights, LEDs, or other electrically actuated color indicators mounted to or fitted within the mounting adaptor 124. The example mounting adapter 124 further includes a display disable system 138 mounted within the mounting adapter 124 for disabling the PED display.

Figure 2:
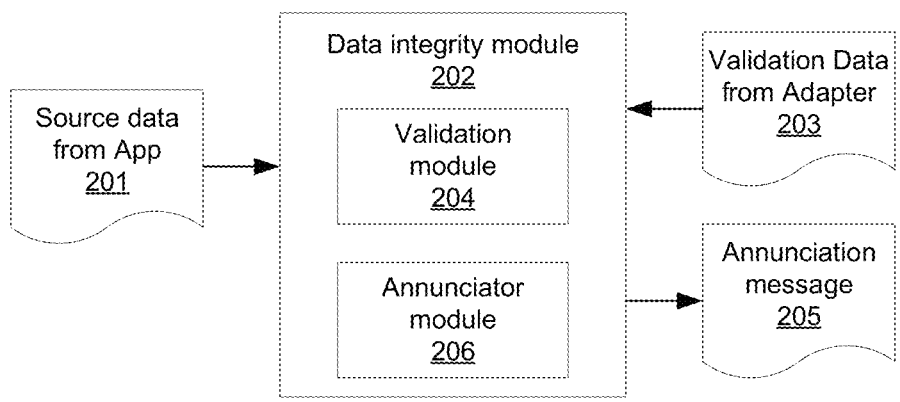
FIG. 2 is a block diagram depicting an example data integrity module in a server in an aircraft that allows the display of critical aeronautical information on an aircraft display that is not certified for displaying critical aeronautical information, in accordance with various embodiments.

FIG. 2 is a block diagram depicting an example data integrity module 202 that provides a way to display critical aeronautical information on an aircraft display that is not certified for displaying critical aeronautical information. The example data integrity module includes a validation module 204 and an annunciator module 206. All or parts of the example data integrity module may be incorporated in a server (e.g., server 100), an application module (e.g., application module 108), in a mounting adapter (e.g., mounting adapter 124), or in an adapter controller (e.g., adapter controller 134).

The validation module 204 is configured to compare source data 201 (e.g., critical aeronautical information) received by the data integrity module 202 from a high integrity avionics application (e.g., high integrity avionics application module 108, 128) to validation data 203 (which includes PED image information) received by the data integrity module 202 from a monitoring adapter (e.g., mounting adapter 104, 124). The validation module 204 is configured to compare the source data 201 to the validation data 203 to determine whether a problem exists with the display of mission critical data on the uncertified display device (e.g., PED 106, 126). The example validation module 204 is configured to determine whether a problem exists with the display of mission critical data on the uncertified display device (e.g., PED 106, 126) by verifying the ICA of the mission critical data displayed on the uncertified display device (e.g., PED 106, 126).

The annunciator module 206 is configured to communicate an annunciation indicator 205 (e.g., a loss of ICA) to the mounting adapter (e.g., mounting adapter 104, 124) that instructs the mounting adapter to provide an annunciation indicating that a problem exists with the display of mission critical data on the uncertified display device, when the validation module 204 determines that a problem does exist with the display of the mission critical data. The annunciation indicator may command an annunciator light (e.g., annunciator ring 116, 136) to display a certain color. The annunciation indicator may command the display disable system (e.g., display disable system 118, 138) to shut off the display on the uncertified display device (e.g., PED 106, 126).

Figure 3:
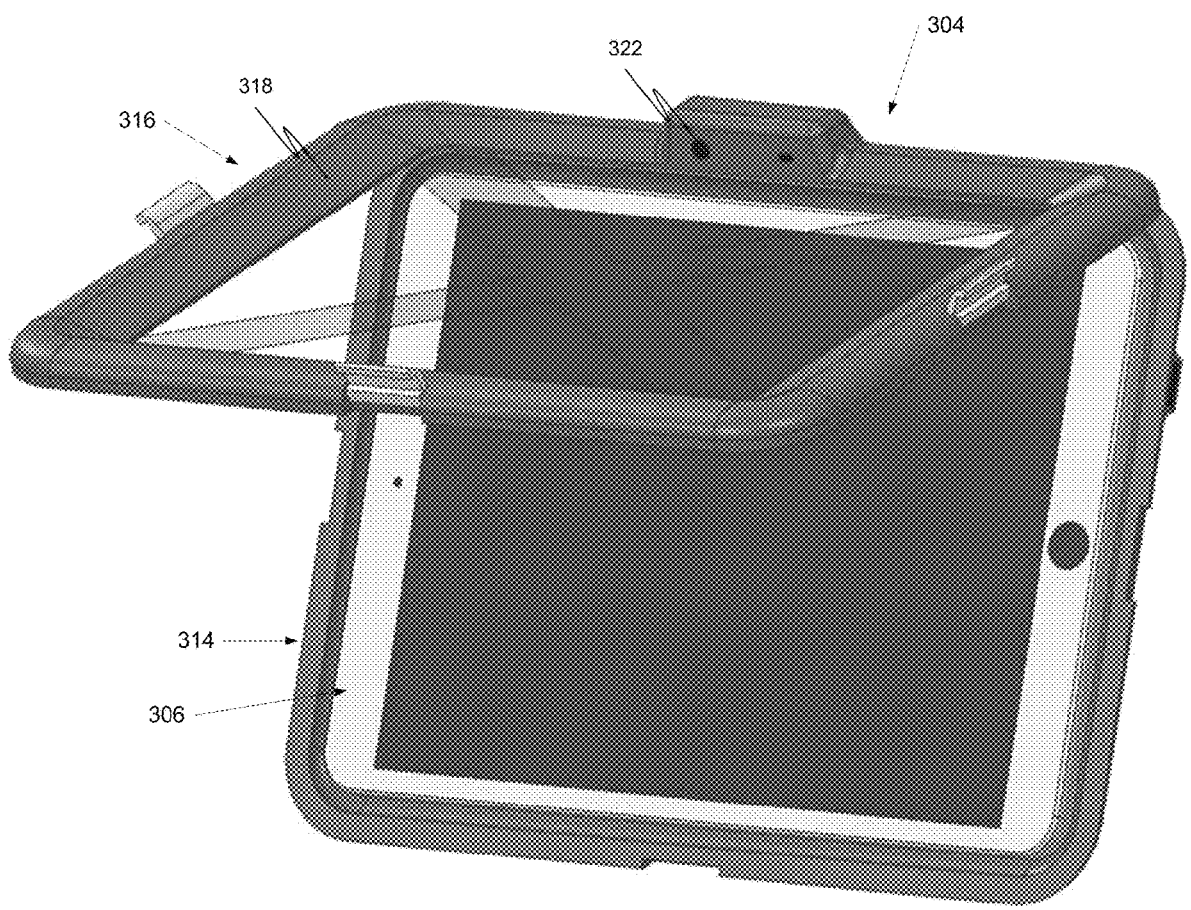
FIG. 3 is a diagram depicting a simplified perspective view of an example mounting adapter, in accordance with various embodiments.

FIG. 3 is a diagram depicting a simplified perspective view of an example mounting adapter 304. The example mounting adapter 304 incorporates a clamshell design configured to mechanically capture a PED/tablet 306 and mount the mounting adapter 304 and PED 306 combination (i.e., the display assembly) in the aircraft flight deck or cockpit.

The example mounting adapter 304 includes a base or back 314 and a lid, cover, or front 316. The example base or back 314 is configured to be slightly larger than the outline of the tablet 306 to be mounted find may have threaded mounting bosses on the back to facilitate installation of the mounting adapter 304 in the aircraft. The example base 314 may also host multiple electrical wiring necessary to provide power and data exchange with a server.

The example mounting adapter 304 is also configured with a lid 316 that may be closed over the top of the tablet 306 to fully enclose the tablet 306 within the mounting adapter 304. The example lid 316 includes a bezel 318, which hosts an optical imaging device 322 (e.g., a camera) The example bezel 318 is attached to the base 314 by hinges (not shown) or other mechanical means Land closes around the tablet 306 to mechanically capture the tablet 306.

An imaging device 322, such as a small camera (e.g., a camera similar to one that might be included in a smart phone), can be mounted or embedded on/in the bezel 318 of the lid 316 and aimed in a manner to provide for maximum view of the tablet display. More than one imaging device 322 may be used or a corrective lens (not shown) may be applied to compensate for the extremely oblique viewing angle the imaging device 322 may have with the tablet's display. The viewing angle of the imaging device(s) 322 may be enhanced or augmented by the use of lenses to optimize the image quality.

In another example, an imaging device is not needed, rather the captured image is generated using operating system support from the low integrity device (for example a screen capture or snapshot function). The captured image is sent by the low integrity device 306 to the server where it can be compared to the reference expected image generated in the server, and if the difference exceeds the threshold, a system failure is asserted.

The example mounting adapter 304 further includes an annunciator light (not shown) for providing an annunciation regarding the PED 306. The annunciator light may comprise an LED strip that is fitted around the PED 306 when the PED 306 is mounted in the mounting adapter 304. The annunciator light may alternatively compose one or more lights, LEDs, or other electrically actuated color indicators mounted to or fitted within the mounting adaptor 304 The annunciator ring may comprise a flexible individually addressable RGB LED strip or other electrically actuated color indicator that is mounted inside a diffuser that is fitted around the PED 306 when the PED 306 is mounted in the mounting adapter 304. The diffuser may be incorporated in or mounted within the base 314

The example mounting adapter 304 further includes a display disable system (e.g., a kill switch) mounted within the mounting adapter 304 for disabling the FED display 306. The display disable system may comprise a magnetic kill switch. An example magnetic kill switch may comprise a combination of one or more permanent magnets and one or more electrically actuated magnets (e.g., electromagnet), wherein the one or more permanent magnets may comprise a from mounted permanent magnet and the one or more electrically actuated magnets may comprise a back mounted electro-magnet. The back mounted electro-magnet, when enabled, may cause, in combination with the front mounted permanent magnet, the PED display to shut off. The front mounted permanent magnet may be positioned within the lid 316 and the back mounted electro-magnet may be positioned within the base 316.

The example mounting adapter 304 further includes an adapter controller (not shown) The adapter controller may be configured to transmit images from the display on the PED 306 to an application server (e.g., server 102 from FIG. 1), receive messages or other indicators from the server indicating that a problem exists with the display of mission critical data on the tablet display (e.g. a loss of ICA), enable the display disable system (e.g., kill switch) to shut off the PED display when the server determines that a problem exists with the display of the mission critical data, and command the annunciator light to illuminate in a particular color (e.g., red) that indicates that a problem exists with the display of mission critical data on the tablet display the PED display and/or indicate that the PED was shut off because the problem exists with the image displayed on the PED display. The controller may be configured to obtain the captured frame from the PED display via an optical sensor The controller may be configured to obtain the captured frame from the PED display via a screen capture feature of the PED.

The controller may be further configured to command the annunciator light to remain off or illuminate in a second color (e.g., green) that indicates that no problem was detected with the display of critical information on the PED display responsive to receiving a message or other indicator from the server indicating that no problem was detected with the image displayed on the PED display. The controller may be further configured to disable the display disable system (e.g., kill switch) from shutting off the PED display responsive to receiving a message or other indicator from the server indicating that no problem was detected with the image displayed on the PED display.

The example mounting adapter 304 may also include a data integrity module (not shown) that is configured to monitor the image displayed on an uncertified cockpit display when critical aeronautical information is transmitted from a high integrity avionics application module to the uncertified cockpit display device to determine whether a problem exists with the display of the mission critical data on the uncertified display device. The example data integrity module is configured to determine whether a problem exists with the display of the mission critical data on the uncertified display device by verifying the integrity, continuity, and availability (ICA) of the mission critical data displayed on the uncertified display device. The example data integrity module is also configured to cause an annunciation indicating that a problem exists with the display of mission critical data on the uncertified display device, when it determines that a problem indeed exists. The data integrity module may be implemented by the adapter controller or by a separate controller.

Figure 4:
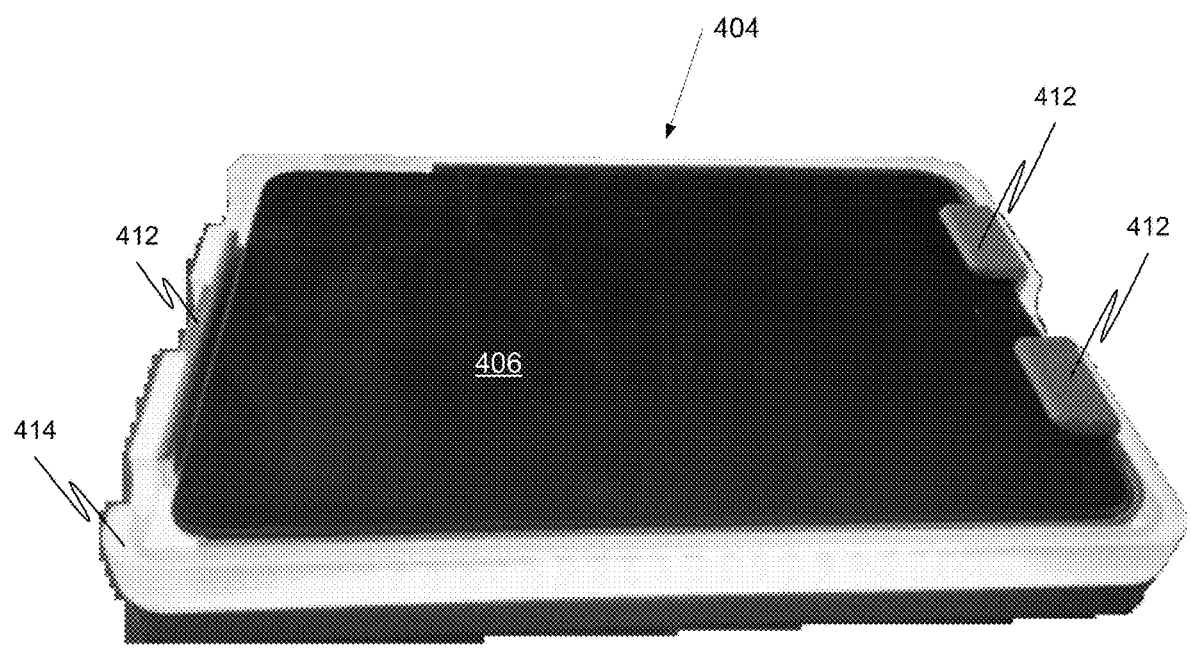
FIG. 4 is a diagram depicting a simplified perspective view of another example mounting adapter, in accordance with various embodiments.

FIG. 4 is a diagram depicting a simplified perspective view of another example mounting adapter 404. The example mounting adapter 404 is configured to mechanically capture a PED/tablet 406 and mount the mounting adapter 404 and PED 406 combination (i.e., the display assembly) in the aircraft flight deck or cockpit.

The example mounting adapter 404 includes a base or back 412. The example base 412 is configured to be slightly larger than the outline of the tablet 406 to be mounted and may have threaded mounting bosses on the back to facilitate installation of the mounting adapter 404 in the aircraft. The example base 412 may also host multiple electrical wiring necessary to provide power and data exchange with a server.

The example mounting adapter 404 includes a diffuser 414 mounted around the base 412 that hosts an annunciator light for providing an annunciation regarding the PED 406. The annunciator light may comprise an annunciator ring such as a LED strip or other electrically actuated color indicator that is fitted around the PED when the PED is mounted in the mounting adapter. The annunciator ring may comprise a flexible individually addressable RGB LED strip that is mounted inside the diffuser 414 that is fitted around the PED when the PED is mounted in the mounting adapter.

The example mounting adapter 404 further includes a display disable system (e.g., kill switch) mounted within the mounting adapter for disabling the PED display. The display disable system may comprise a magnetic kill switch. An example magnetic kill switch may comprise one or more permanent magnets such as a front mounted permanent magnet (e.g., on an upper side of base 412 and facing the PED) and one or more electrically actuated magnets such as a back mounted electro-magnet (e.g., on the 412 underneath the PED). The back mounted electro-magnet, when enabled, may cause, in combination with the front mounted permanent magnet, the PED display to shut off.

The example mounting adapter 404 further includes an adapter controller (not shown). The adapter controller is configured to transmit images from the display on the PED 406 to an application server (e.g., server 102 from FIG. 1), receive messages or other indicators from the server indicating that a problem exists with the display of mission critical data on the tablet display (e.g. a loss of ICA), enable the display disable system (e.g., kill switch) to shut off the PED display when the server determines that a problem exists with the display of the mission critical data and command the annunciator light to illuminate in a particular color (e.g., red) that indicates that a problem exists with the display of mission critical data on the tablet display the PED display and/or indicate that the PED was shut off because the problem exists with the image displayed on the PED display. The controller may be configured to obtain the captured frame from the PED display via an optical sensor. The controller may be configured to obtain the captured frame from the PED display via a screen capture feature of the PED.

The controller may be further configured to command the annunciator light to remain off or illuminate in a second color (e.g., green) that indicates that no problem was detected with the display of critical information on the PED display responsive to receiving a message or other indicator from the server indicating that no problem was detected with the image displayed on the PED display. The controller may be further configured to disable the display disable system (e.g., kill switch) from shutting off the PED display responsive to receiving a message or other indicator from the server indicating that no problem was detected with the image displayed on the PED display.

The example mounting adapter 404 may also include a data integrity module (not shown) that is configured to monitor the image displayed on tin uncertified cockpit display when critical aeronautical information is transmitted from a high integrity avionics application module to the uncertified cockpit display device to determine whether a problem exists with the display of the mission critical data on the uncertified display device. The example data integrity module is configured to determine whether a problem exists with the display of the mission critical data on the uncertified display device by verifying the integrity, continuity, and availability (ICA) of the mission critical data displayed on the uncertified display device. The example data integrity module is also configured to cause an annunciation indicating that a problem exists with the display of mission critical data on the uncertified display device, when it determines that a problem indeed exists. The data integrity module may be implemented by the adapter controller or by a separate controller.

Figure 5A:
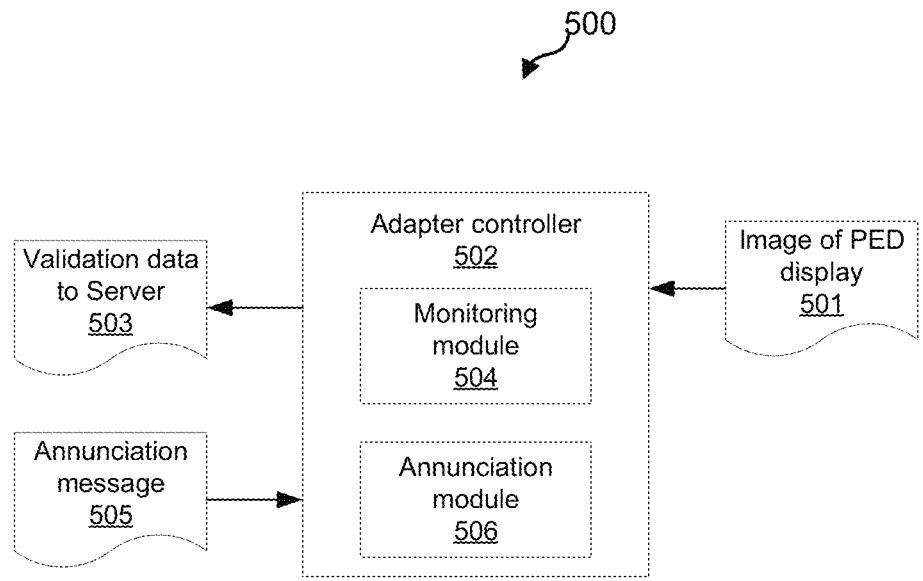
FIG. 5A is a block diagram depicting an example adapter controller in a mounting adapter, in accordance with various embodiments.

FIG. 5A is a block diagram depicting an example adapter controller 502 in a mounting adapter 500. The example adapter controller 502 includes a monitoring module 504 and an annunciation module 506. The example adapter controller 502 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while live processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. In other embodiments, the adapter controller 562 may not include a processor.

The example monitoring module 504 is configured to retrieve an image 501 of the PED display from an imaging sensor (e.g., imaging sensor from imaging device 322 from FIG. 3 or captured frame from the PED display via a screen capture feature of the PED) and transmit validation data 503 (which includes image information from the PED display) to an application server (e.g., server 102 from FIG. 1). The example annunciation module 506 is configured to receive an annunciation message 505 (or other indicator) from the server indicating that a problem exists with the display of mission critical data on the PED display (e.g. a loss of ICA), and enable the display disable system (e.g., kill switch) to shut off the PED display and command the annunciator light to illuminate in a particular color (e.g., red) that indicates that a problem exists with the display of mission critical data on the tablet display the PED display and/or indicate that the PED was shut off because the problem exists with the image displayed on the PED display.

The example annunciation module 506 may be further configured to command the annunciator light to remain off or illuminate in a second color (e.g., green) that indicates that no problem was detected with the display of critical information on the PED display responsive to receiving a message or other indicator from the server indicating that no problem was detected with the image displayed on the PED display. The controller may be further configured to disable the display disable system (e.g., kill switch) from shutting off the PED display responsive to receiving a message or other indicator from the server indicating that no problem was detected with the image displayed on the PED display.

Figure 5B:
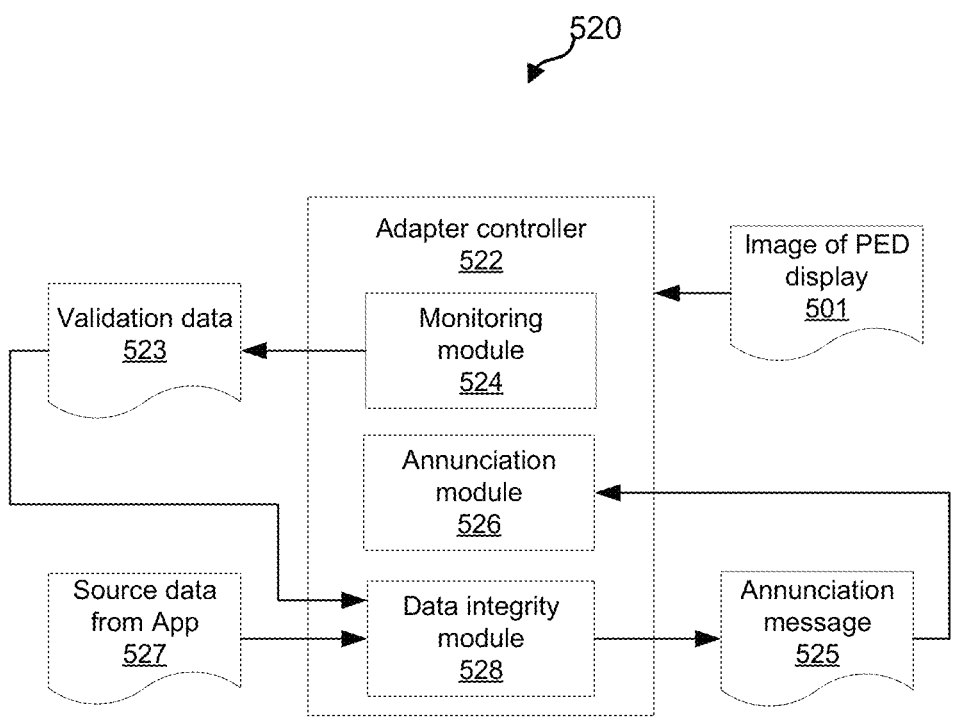
FIG. 5B is a block diagram depicting another example adapter controller in a mounting adapter, in accordance with various embodiments.

FIG. 5B is a block diagram depicting another example adapter controller 522 in a mounting adapter 520. The example adapter controller 522 includes a monitoring module 524 and an annunciation module 526. The example adapter controller 522 includes at least one processor and a computer-readable storage device or media encoded with programming instructions for configuring the controller.

The example monitoring module 504 is configured to retrieve an image 501 of the PED display from an imaging sensor (e.g., imaging sensor from imaging device 322 from FIG. 3 or captured frame from the PED display via a screen capture feature of the PED) and transmit validation data 523 (which includes image information from the PED display) to a data integrity module 528. The example annunciation module 526 is configured to receive an annunciation message 525 (or other indicator) from the data integrity module 528 indicating that a problem exists with the display of mission critical data on the PED display (e.g. a loss of ICA), and enable the display disable system (e.g., kill switch) to shut off the PED display and command the annunciator light to illuminate in a particular color (e.g., red) that indicates that a problem exists with the display of mission critical data on the tablet display the PED display and/or indicate that the PED was shut off because the problem exists with the image displayed on the PED display.

The example annunciation module 526 may be further configured to command the annunciator light to remain off or illuminate in a second color (e.g., green) that indicates that no problem was detected with the display of critical information on the PED display responsive to receiving a message or other indicator from the data integrity module 528 indicating that no problem was detected with the image displayed on the PED display. The controller may be further configured to disable the display disable system (e.g., kill switch) from shutting off the PED display responsive to receiving a message or other indicator from the server indicating that no problem was detected with the image displayed on the PED display.

The data integrity module 528 is configured to compare the validation data 523 image with source data 527 from the app that generated the data displayed on the PED to determine whether a problem exists with the display of the mission critical data on the uncertified display device. The example data integrity module 528 is configured to determine whether a problem exists with the display of the mission critical data on the uncertified display device by verifying the integrity, continuity, and availability (ICA) of the mission critical data displayed on the uncertified display device. The example data integrity module 528 is also configured to cause an annunciation indicating that a problem exists with the display of mission critical data on the uncertified display device, when it determines that a problem indeed exists by providing an indication to the annunciation module 526.

Referring again to FIGS. 1, 3 and 4, the example system 100 may function as follows. An avionics application 108 such as a CDTI may execute on the server 102 while an avionics display application 110 executes on the tablet 106, 306, or 406. The tablet 106, 306, or 406 is enclosed in the mounting adapter 104, 304 or 404 which is mounted on the flight deck in a suitable location (e.g., on the outboard side of the crew's seats). The mounting adapter 104, 304 or 404 may be connected to the server 102 by several bus wires, such as a bi-directional data bus which allows for information exchanges between the tablet 106, 306, or 406 and the server 102 (and perhaps supplies power to the tablet), and a bus to carry video information from the imaging device 322 to the server 102. Alternatively, the mounting adapter 104, 304, or 404 may be wirelessly connected to the server 102. The mounting adapter 104, 304, or 404 may be additionally differentiated from commercially available tablet cases in that it may be qualified for aviation use by providing mechanical and electrical protection for the tablet 106, 306, or 406 and the aircraft by being qualified according to RTCA DO-160(x).

The example system 100 can allow uncertified display devices such as PEDs/tablets 106, 306, or 406 to display critical aeronautical information by performing two functions: ICA monitoring and providing crew annunciation of non-nominal ICA status.

ICA monitoring may be accomplished in two layers as follows. The avionics application 108 executing on the server will determine what information/images need to be displayed on the tablet 106 and will encode (e.g., using tokenized OpenGL or HTML5) and transmit that information to the avionics display application 110 executing on the tablet 106, 306, or 406. In the first layer, prior to displaying any of this information, the avionics display application 110 will decode the information to be displayed and re-encode it in a dis-similar protocol and "echo back" the information to the server 102, which will compare the echo-back information with the information originally sent. Matching information will result in an "ack" (acknowledgement) from the server to the tablet while a mismatch would generate a "no-ack" and a crew annunciation. This first laser provides for monitoring the ICA to the avionics display application 110 but does not provide for monitoring the link between the avionics display application 110 and the physical display.

In the second layer, the system may monitor the actual information displayed on the screen via a screen capture by the PED (e.g., using an operating system screen capture feature provided by an adapter controller in the mounting adapter or directly from the PED) or the image sensor 322 mounted on the bezel 318. As an example, monitoring may include monitoring all aspects of the display (color and location of every pixel) or using a sampling scheme where the probability of detecting loss of ICA is equivalent or better to the requirements of the Hazard Classification of the application. Thus, the monitoring rigor can be tailored to the criticality of the application. Sampling schemes could be further simplified by using specific patterns like QR codes which are camouflaged and displayed for a few milliseconds on the display and may be customized for optimal recognizability by the image sensor 322 (e.g., a keystone, hyperbolic, or other optimal shape). The codes could be randomly changed in content, location, and timing to add robustness to the sampling scheme. In any case, the optical information imaged by the image sensor 322 is sent back to the server 102 to enable the software application 108 to compare the image detected to what it expected to see based on what it sent to the PED 106, 306, or 406 for display, if a loss of ICA is detected, the server 102/application 108 would activate the appropriate annunciation.

If the server 102/application 108 determines that there has been a loss of ICA, it can activate an annunciation by asserting the appropriate electrical signal on the output bus to the controller in the adapter 104, 304, 404. The example mounting adapters 104, 304, 404 are capable of be illuminated in an appropriate color (or no illumination at all) to represent various possible states that the server has determined that the uncertified PED 106, 306, 406 is in. Example states and associated colors may include: (a) normal operation and no critical application being displayed (e.g., no illumination or green illumination), (b) normal operation and critical application being display (e.g., cyan illumination) (a critical application might be one in which loss of function or operator termination may result in an unsafe condition or place the crew in violation of an approved clearance from Air Traffic Control); or (c) non-normal operation/loss of integrity (e.g., amber illumination or red illumination).

The example mounting adapters 104, 304, 404 also provide for the use of appropriately placed permanent and electromagnets that, when activated, may interact with various sensors, such as Hall Effect sensors, found in commercial tablet devices. These sensors are typically present to facilitate the tablet shutting off its display backlight and/or placing the tablet into a low power state such as a standby state when an appropriately designed cover is closed over the viewable surface of the tablet. When the remote application server determines that a loss of integrity state has occurred on the commercial tablet, it may send a signal to the example mounting adapter 104, 304, 404 to not only activate the appropriate illumination as described above (e.g., amber or red) but also activate the appropriate magnetic devices resulting in the tablet shutting off the display backlight and/or going into a standby or other low power state where the display is no longer illuminated.

Taken together, these two elements may unambiguously and positively prevent misleading or hazardously misleading information from being displayed to the flight crew and inform them of the loss of integrity state of the tablet. Moreover, this type of annunciation could also be used with certified displays to increase their reliability or to reduce their design complexity.

Figure 6:
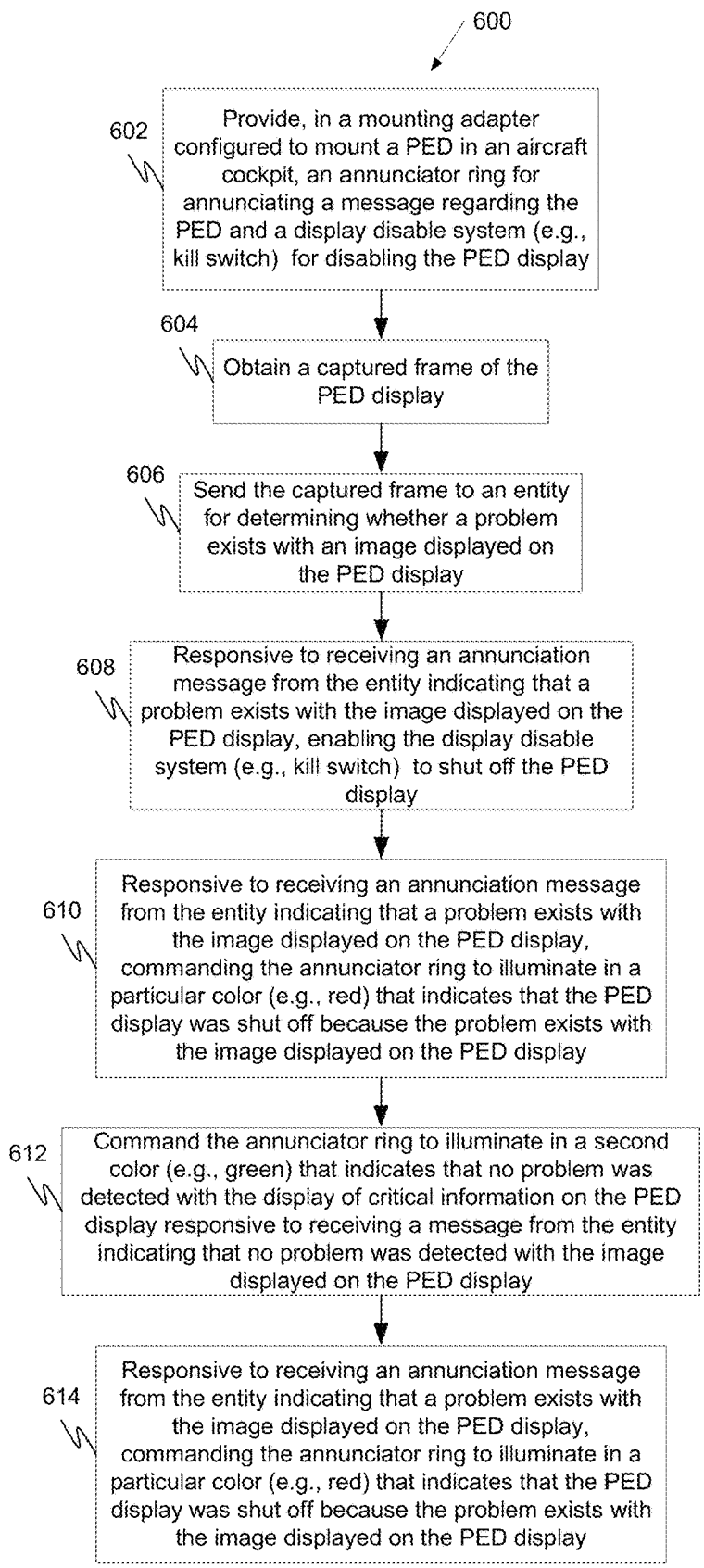
FIG. 6 is a process flow-chart, depicting an example process in a display system configured for displaying critical aeronautical information on a PED that is not certified for displaying the critical aeronautical information, in accordance with various embodiments.

FIG. 6 is a process flow chart depicting an example process 600 in a display system configured for displaying critical aeronautical information on a personal electronic device (PED) having a PED display that is not certified for displaying the critical aeronautical information. The order of operation within the process 600 is not limited to the sequential execution as illustrated in the figure, but may be performed in one or more varying orders as applicable and in accordance with the present disclosure.

The example process 600 includes providing, in a mounting adapter configured to mount a PED in an aircraft cockpit, an annunciator light for providing an annunciation regarding the PED and a display disable system (e.g., kill switch) for disabling the PED display (operation 602). The annunciator light may comprise an annunciator ring such as a LED strip that is fitted around the PED when the PED is mounted in the mounting adapter.

The example process 600 includes obtaining a captured frame of the PED display (operation 604). The captured frame may be obtained via an optical sensor trained on the PED display. The captured frame may be obtained via a screen capture feature of the PED. The captured frame may be obtained at a periodic rate.

The example process 600 includes sending the captured frame to an entity for determining whether a problem exists with an image displayed on the PED display (operation 606). The entity may be a server remote from the display system or may be implemented by a controller on the mounting adapter. The example process 600 includes, responsive to receiving an annunciation message or other indicator from the entity indicating that a problem exists with the image displayed on the PED display, enabling the display disable system (e.g., kill switch) to shut off the PED display (operation 608) and commanding the annunciator light to illuminate in a particular color (e.g., red) that indicates that the PED display was shut off because the problem exists with the image displayed on the PED display (operation 610). Operations 608 and 610 could be performed in the order indicated in the figure, with operation 610 performed before operation 608, or performed simultaneously.

The example process 600 optionally may include commanding the annunciator light to illuminate in a second color (e.g., green) that indicates that no problem was detected with the display of critical information on the PED display responsive to receiving a message or other indicator from the entity indicating that no problem was detected with the image displayed on the PED display or optionally may include not commanding the annunciator light to do anything in response to receiving a message or other indicator indicating that no problem was detected (operation 612). The example process 600 may include disabling the display disable system (e.g., kill switch) from shutting off the PED display responsive to receiving a message or other indicator from the entity indicating that no problem was detected with the image displayed on the PED display (operation 614).

Described herein are apparatus, systems, techniques, and articles for providing assurance that a display accurately conveys mission critical information. In one embodiment, a mounting system configured to mount a personal electronic device (PED) having a PED display in an aircraft flight deck and provide a visible indication when a fault condition exists concerning the display of critical aeronautical information on the PED display is provided. The mounting system comprises: an annunciator light comprising an electrically actuated color indicator (e.g., LED strip) for providing an annunciation regarding the PED; a display disable system (e.g., kill switch) mounted within the mounting system for disabling the PED display; and a controller configured to: obtain a captured frame of the PED display (e.g., from a screen capture feature of the PED or a camera trained on the PED display); send the captured frame to a data integrity entity (e.g., a server remote from the display system or a controller on the mounting adapter that implements a data integrity module) for determining whether a problem exists with an image displayed on the PED display; and responsive to receiving an annunciation message or other indicator from the data integrity entity indicating that the problem exists with the image displayed on the PED display, enable the display disable system to shut off the PED display and command the annunciator light to illuminate in a particular color (e.g., red) that indicates that the PED display was shut off because the problem exists with the image displayed on the PED display.

These aspects and other embodiments max include one or more of the following features. The mounting system may further comprise an optical sensor positioned to view the PED display and configured to record an image of the PED display. The controller may be configured to obtain the captured frame from the PED display via the optical sensor. The controller may be configured to obtain the captured frame from the PED display via a screen capture feature of the PED. The annunciator light may comprise a flexible individually addressable RGB LED strip (or other electrically actuated color indicator) that is mounted inside a diffuser that is fitted around the PED when the PED is mounted in the mounting adapter. The display disable system may comprise a magnetic kill switch. The magnetic kill switch max comprise a combination of one or more permanent magnets and one or more electrically actuated magnets (e.g., electromagnet), wherein the one or more electrically actuated magnets, when enabled, causes, in combination with the one or more permanent magnets, the PED display to shut off. The controller may be further configured to, responsive to receiving an indicator from the data integrity entity indicating that no problem was detected with the image displayed on the PED display, command the annunciator light to illuminate in a second color (e.g., green) that indicates that no problem was detected with the display of critical information on the PED display. The controller may be further configured to, responsive to receiving an indicator from the data integrity entity indicating that no problem was detected with the image displayed on the PED display, disable the display disable system from shutting off the PED display. The mounting system may further comprise: a base configured to receive the PED and securely mount the PED on the aircraft flight deck; and a lid configured to cooperate with the base when in a closed position to encase the PED, the annunciator light, find the display disable system. The mounting system may further comprise an optical sensor positioned within the lid to view the PED display and configured to record an image of the PED display. The display disable system may comprise a front mounted permanent magnet positioned within the lid and a back mounted electro-magnet positioned within the base that when enabled causes, in combination with the front mounted permanent magnet, the PED display to shut off.

In another embodiment, a display system configured for displaying critical aeronautical information on an aircraft display that is not certified for displaying the critical aeronautical information is provided. The display system comprises: a personal electronic device (PED) having a PED display wherein the PED is not certified to display the critical aeronautical information; a mounting adapter configured to mount the PED in an aircraft cockpit, the mounting adapter comprising: an annunciator light comprising an electrically actuated color indicator (e.g., LED strip) for providing an annunciation regarding the PED; a display disable system (e.g., kill switch) mounted within the mounting adapter for disabling the PED display; and a controller configured to: obtain a captured frame of the PED display (e.g., from a screen capture feature of the PED or a camera trained on the PED display), send the captured frame to a data integrity entity (e.g., a server remote from the display system or a controller on the mounting adapter that implements a data integrity module) for determining whether a problem exists with an image displayed on the PED display, and responsive to receiving an annunciation indicator from the data integrity entity indicating that the problem exists with the image displayed on the PED display, enable the display disable system to shut off the PED display and command the annunciator light to illuminate in a particular color (e.g., red) that indicates that the PED display was shut off because the problem exists with the image displayed on the PED display.

These aspects and other embodiments may include one or more of the following features. The data integrity entity may comprise an application server configured to: execute one or more modules that generate the critical aeronautical information; transmit the generated critical aeronautical information to the PED for display on the PED display; determine from the captured frame whether the problem exists with the image displayed on the PED display; and responsive to determining that the problem exists with the image displayed on the PED display, transmit the annunciation indicator to the controller to enable the display disable system to shut off the PED display and the annunciator light to illuminate in the particular color that indicates that the PED display was shut off because the problem exists with the image displayed on the PED. The annunciator light may comprise a flexible individually addressable RGB LED strip (or other electrically actuated color indicator) that is mounted inside a diffuser that is fitted around the PED when the PED is mounted in the mounting adapter. The display disable system may comprise a magnetic kill switch. The magnetic kill switch may comprise a combination of one or more permanent magnets and one or more electrically actuated magnets (e.g., electromagnet), wherein the one or more electrically actuated magnets, when enabled, causes, in combination with the one or more permanent magnets, the PED display to shut off. The controller may be further configured to, responsive to receiving an indicator from the data integrity entity indicating that no problem was detected with the image displayed on the PED display, command the annunciator light to illuminate in a second color (e.g., green) that indicates that no problem was detected with the display of critical information on the PED display. The controller may be further configured to, responsive to receiving an indicator from the data integrity entity indicating that no problem was detected with the image displayed on the PED display, disable the display disable system from shutting off the PED display. The mounting adapter may further comprise a base configured to receive the PED and securely mount the PED on the aircraft flight deck and a lid configured to cooperate with the base when in a closed position to encase the PED, the annunciator light, and the display disable system. The display system may further comprise an optical sensor positioned within the lid to view the PED display and configured to record an image of the PED display. The display disable system may comprise a front mounted permanent magnet positioned within the lid and a back mounted electro-magnet positioned within the base that when enabled causes, in combination with the front mounted permanent magnet, the PED display to shut off. The display system may further comprise an optical sensor positioned to view the PED display and configured to record an image of the PED display. The controller may be configured to obtain the captured frame from the PED display via the optical sensor. The controller may be configured to obtain the captured frame from the PED display via a screen capture feature of the PED.

In another embodiment, a method in a display system configured for displaying critical aeronautical information on a personal electronic device (PED) having a PED display that is not certified for displaying the critical aeronautical information is provided. The method comprises: providing in a mounting adapter configured to mount the PED in an aircraft cockpit: an annunciator light comprising an electrically actuated color indicator (e.g., LED strip) for providing an annunciation regarding the PED and a display disable system (e.g., kill switch) mounted within the mounting, adapter for disabling the PED display: obtaining a captured frame of the PED display (e.g., from a screen capture feature of the PED or a camera trained on the PED display); sending the captured frame to an entity for determining whether a problem exists with an image displayed on the PED display; and responsive to receiving an annunciation indicator from the data integrity entity indicating that the problem exists with the image displayed on the PED display, enabling the display disable system to shut off the PED display and commanding the annunciator light to illuminate in a particular color (e.g., red) that indicates that the PED display was shut off because the problem exists with the image displayed on the PED display.

These aspects and other embodiments may include one or more of the following features The method may further comprise commanding the annunciator light to illuminate in a second color (e.g., green) that indicates that no problem was detected with the display of critical information on the PED display responsive to receiving an indicator from the data integrity entity indicating that no problem was detected with the image displayed on the PED display. The method may further comprise disabling the display disable system from shutting off the PED display responsive to receiving an indicator from the data integrity entity indicating that no problem was detected with the image displayed on the PED display The method may further comprise obtaining the captured frame from the PED display via an optical sensor trained on the PED display. The method may further comprise obtaining the captured frame from the PED display via a screen capture feature of the PED.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, tin embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate arras (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, ETPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A mounting system configured to mount a personal electronic device (PED) having a PED display in an aircraft flight deck and provide a visible indication when a fault condition exists concerning the display of critical aeronautical information on the PED display, the mounting system comprising:
    a base configured to receive the PED and securely mount the PED on the aircraft flight deck;
    a lid configured to cooperate with the base when in a closed position to encase the PED;
    a plurality of light sources in the base that are fitted around the PED when the PED is mounted in the base, the plurality of light sources configured as an electrically actuated color indicator configured to provide an annunciation regarding the PED;
    a first magnet positioned on the lid and a second magnet mounted on the base, wherein one of the first magnet and the second magnet comprises a permanent magnet and one of the first magnet and the second magnet comprises an electrically actuated magnet; and
    a controller in the mounting adaptor configured to:
        obtain a captured frame of the PED display;
        send the captured frame to a data integrity entity for determining whether a problem exists with an image displayed on the PED display; and
        enable the electrically actuated magnet responsive to receiving an annunciation indicator from the data integrity entity indicating that the problem exists with the image displayed on the PED display; and
        command the plurality of light sources fitted around the PED to illuminate in a first visible color that indicates that the PED display was shut off because the problem exists with the image displayed on the PED display responsive to receiving an annunciation indicator from the data integrity entity indicating that the problem exists with the image displayed on the PED display;
    wherein the electrically actuated magnet when enabled is configured to cooperate with the permanent magnet to cause the PED display to shut off.

2. The mounting system of claim 1, further comprising an optical sensor positioned to view the PED display and configured to record the image of the PED display.

3. The mounting system of claim 2, wherein the controller is configured to obtain the captured frame from the PED display via the optical sensor.

4. The mounting system of claim 1, wherein the controller is configured to obtain the captured frame from the PED display via a screen capture feature of the PED.

5. The mounting system of claim 1, wherein the plurality of light sources comprise a flexible individually addressable RGB LED strip that is mounted inside a diffuser that is fitted around the PED when the PED is mounted in the mounting system.

6. The mounting system of claim 1, wherein the controller is further configured to, responsive to receiving an indicator from the data integrity entity indicating that no problem was detected with the image displayed on the PED display, command the plurality of light sources to illuminate in a second visible color that indicates that no problem was detected with the display of critical information on the PED display.

7. The mounting system of claim 6, wherein the controller is further configured to, responsive to receiving an indicator from the data integrity entity indicating that no problem was detected with the image displayed on the PED display, disable the electrically actuated magnet wherein the electrically actuated magnet ceases cooperation with the permanent magnet to cause the PED display to shut off.

8. The mounting system of claim 1, further comprising an optical sensor positioned within the lid to view the PED display and configured to record the image of the PED display.

9. A display system configured for displaying critical aeronautical information on an aircraft display that is not certified for displaying the critical aeronautical information, the display system comprising:
  a personal electronic device (PED) having a PED display wherein the PED is not certified to display the critical aeronautical information; and
  a mounting adapter configured to mount the PED in an aircraft cockpit, the mounting adapter comprising:
    a base configured to receive the PED and securely mount the PED;
    a lid configured to cooperate with the base when in a closed position to encase the PED;
    a plurality of light sources in the base that are fitted around the PED when the PED is mounted in the base, the plurality of light sources configured as an electrically actuated color indicator configured to provide an annunciation regarding the PED;
    a first magnet positioned on the lid and a second magnet mounted on the base, wherein one of the first magnet and the second magnet comprises a permanent magnet and one of the first magnet and the second magnet comprises an electrically actuated magnet; and
  a controller configured to:
    obtain a captured frame of the PED display;
    send the captured frame to a data integrity entity for determining whether a problem exists with an image displayed on the PED display; and
    enable the electrically actuated magnet responsive to receiving an annunciation indicator from the data integrity entity indicating that the problem exists with the image displayed on the PED display; and
    command the plurality of light sources fitted around the PED to illuminate in a first visible color that indicates that the PED display was shut off because the problem exists with the image displayed on the PED display responsive to receiving an annunciation indicator from the data integrity entity indicating that the problem exists with the image displayed on the PED display;
  wherein the electrically actuated magnet when enabled is configured to cooperate with the permanent magnet to cause the PED display to shut off.

10. The display system of claim 9, wherein the entity comprises an application server comprising one or more processors, the application server configured to:
  execute one or more modules that generate the critical aeronautical information;
  transmit the generated critical aeronautical information to the PED for display on the PED display;
  determine from the captured frame whether the problem exists with the image displayed on the PED display; and
  responsive to determining that the problem exists with the image displayed on the PED display, transmit the annunciation indicator to the controller to enable the electrically actuated magnet and command the plurality of light sources fitted around the PED to illuminate in the first visible color that indicates that the PED display was shut off because the problem exists with the image displayed on the PED.

11. The display system of claim 9, wherein the plurality of light sources comprises a flexible individually addressable RGB LED strip that is mounted inside a diffuser that is fitted around the PED when the PED is mounted in the mounting adapter.

12. The display system of claim 9, wherein the controller is further configured to, responsive to receiving an indicator from the data integrity entity indicating that no problem was detected with the image displayed on the PED display, command the plurality of light sources to illuminate in a second visible color that indicates that no problem was detected with the display of critical information on the PED display.

13. The display system of claim 12, wherein the controller is further configured to, responsive to receiving an indicator from the data integrity entity indicating that no problem was detected with the image displayed on the PED display, disable the electrically actuated magnet wherein the electrically actuated magnet ceases cooperation with the permanent magnet to cause the PED display to shut off.

14. The display system of claim 9, wherein the controller is configured to obtain the captured frame from the PED display via an optical sensor positioned to view the PED display and configured to record the image of the PED display.

15. The display system of claim 9, wherein the controller is configured to obtain the captured frame from the PED display via a screen capture feature of the PED.

16. A method in a display system configured for displaying critical aeronautical information on a personal electronic device (PED) having a PED display that is not certified for displaying the critical aeronautical information, the method comprising:
  providing in a mounting adapter configured to mount the PED in an aircraft cockpit:
    a base configured to receive the PED and securely mount the PED on the aircraft flight deck;
    a lid configured to cooperate with the base when in a closed position to encase the PED;
    a plurality of light sources in the base that are fitted around the PED when the PED is mounted in the base, the plurality of light sources configured as an electrically actuated color indicator configured to provide an annunciation regarding the PED; and
    a first magnet positioned on the lid and a second magnet mounted on the base, wherein one of the first magnet and the second magnet comprises a permanent magnet and one of the first magnet and the second magnet comprises an electrically actuated magnet; and
  obtaining a captured frame of the PED display;
  sending the captured frame to a data integrity entity for determining whether a problem exists with an image displayed on the PED display; and
  enabling the electrically actuated magnet responsive to receiving an annunciation indicator from the data integrity entity indicating that the problem exists with the image displayed on the PED display; and commanding the plurality of light sources fitted around the PED to illuminate in a first visible color that indicates that the PED display was shut off because the problem exists with the image displayed on the PED display responsive to receiving an annunciation indicator from the data integrity entity indicating that the problem exists with the image displayed on the PED display;

wherein the electrically actuated magnet when enabled cooperates with the permanent magnet to cause the PED display to shut off.

17. The method of claim 16, further comprising commanding the plurality of light sources to illuminate in a second color that indicates that no problem was detected with the display of critical information on the PED display responsive to receiving an indicator from the data integrity entity indicating that no problem was detected with the image displayed on the PED display.

18. The method of claim 16, further comprising disabling the electrically actuated magnet responsive to receiving an indicator from the data integrity entity indicating that no problem was detected with the image displayed on the PED display, wherein the electrically actuated magnet ceases cooperation with the permanent magnet to cause the PED display to shut off.

19. The method of claim 16, further comprising obtaining the captured frame from the PED display via an optical sensor positioned to view the PED display and configured to record the image of the PED display.

20. The method of claim 16. further comprising obtaining the captured frame from the PED display via a screen capture feature of the PED.

\* \* \* \* \*